(12) United States Patent
Agarwal et al.

(10) Patent No.: US 10,579,931 B2
(45) Date of Patent: Mar. 3, 2020

(54) INTERPRETATION OF A DATASET FOR CO-OCCURRING ITEMSETS USING A COVER RULE AND CLUSTERING

(71) Applicant: Tata Consultancy Services Limited, Mumbai (IN)

(72) Inventors: Puneet Agarwal, Noida (IN); Gautam Shroff, Gurgaon (IN); Sarmimala Saikia, Noida (IN); Ashwin Srinivasan, Zuarinagar (IN)

(73) Assignee: Tata Consultancy Services Limited, Mumbai (IN)

( * ) Notice: Subject to any disclaimer, the term of this patent is extended or adjusted under 35 U.S.C. 154(b) by 865 days.

(21) Appl. No.: 14/970,726

(22) Filed: Dec. 16, 2015

(65) Prior Publication Data

US 2016/0180229 A1 Jun. 23, 2016

(30) Foreign Application Priority Data

Dec. 17, 2014 (IN) .......................... 4066/MUM/2014

(51) Int. Cl.
*G06N 5/04* (2006.01)
*G06Q 30/02* (2012.01)
*G06F 17/16* (2006.01)

(52) U.S. Cl.
CPC ............. *G06N 5/046* (2013.01); *G06F 17/16* (2013.01); *G06Q 30/0201* (2013.01)

(58) Field of Classification Search
CPC ..... G06N 5/046; G06F 17/16; G06Q 30/0201
See application file for complete search history.

(56) References Cited

U.S. PATENT DOCUMENTS

| 6,651,048 | B1 * | 11/2003 | Agrawal | G06F 17/30539 |
| 6,651,049 | B1 | 11/2003 | Agrawal et al. | |
| 7,792,775 | B2 * | 9/2010 | Matsuda | H04L 63/0263 |
| | | | | 706/47 |
| 7,840,506 | B1 * | 11/2010 | Rubin | G06F 17/30539 |
| | | | | 342/118 |
| 7,870,149 | B2 | 1/2011 | Bollinger et al. | |
| 8,401,986 | B1 * | 3/2013 | Franke | G06N 5/02 |
| | | | | 706/47 |

(Continued)

*Primary Examiner* — Alexey Shmatov
*Assistant Examiner* — Robert Bejcek, II
(74) *Attorney, Agent, or Firm* — Finnegan, Henderson, Farabow, Garrett & Dunner LLP

(57) ABSTRACT

A method and system for interpreting a dataset is described herein. The method include computing a rule set pertaining to the dataset, followed by generating a rule cover pertinent to a subset of the rule set. Further, a plurality of distances between the plurality of rule pairs in the rule cover is calculated and a distance matrix based on the calculated plurality of distances is generated. Consequently, the overlapping rules within the rule cover are clustered using the distance matrix and a representative rule from each cluster is selected. Further, at least one exception for each representative rule is determined and the dataset is interpreted using the representative rules and the at least one exception. Thereby, the method provides succinct results in terms of rules and exceptions along with multiple interpretations of the same set of transactions from the dataset, thereby providing a holistic view about the dataset.

9 Claims, 2 Drawing Sheets

(56) References Cited

U.S. PATENT DOCUMENTS

| | | | |
|---|---|---|---|
| 8,688,480 B1* | 4/2014 | Singh | G06Q 40/08 705/2 |
| 2009/0043714 A1* | 2/2009 | Zhao | G06F 17/30536 706/11 |
| 2013/0019216 A1* | 1/2013 | Vasudevan | G06F 17/504 716/106 |
| 2014/0143186 A1 | 5/2014 | Bala | |

* cited by examiner

INTERPRETATION OF A DATASET FOR CO-OCCURRING ITEMSETS USING A COVER RULE AND CLUSTERING

PRIORITY CLAIM

This U.S. patent application claims priority under 35 U.S.C. § 119 to: India Application No. 4066MUM/2014, filed on Dec. 17, 2014. The entire contents of the aforementioned application are incorporated herein by reference.

TECHNICAL FIELD

This disclosure relates generally to data interpretation, and more particularly to interpretation of a dataset.

BACKGROUND

In recent times, the analytics industry is maturing and therefore competition is enhancing within the analytics industry. In today's rapidly growing global business environment, demand for competent analytical solutions is greater than before. Generally, enterprises store significant quantities of data as information assets. Such data is analyzed to provide a meaning to the data based on which the data may be used for decision-making. For example, enterprises employ various data analytics applications to identify relationships among the stored data sets and act upon the identified relationships.

SUMMARY

Before the present method, system, and hardware enablement are described, it is to be understood that this invention is not limited to the particular system, and methodology described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which Will be limited only by the appended claims.

The present application provides a method and system for interpretation of a dataset.

The present application provides a method for interpretation of a dataset, said method comprising processor implemented steps of computing a rule set pertaining to the dataset, wherein each rule within the rule set comprises a pre-determined consequent based on one or more antecedents; and generating a rule cover comprising a plurality of rules, wherein the rule cover pertain to a subset of the rule set using a rule generation module (120); calculating a plurality of distances between the plurality of rule pairs and generating a distance matrix based on the calculated plurality of distances between the plurality of rule pairs in the rule cover and storing the calculated plurality of distances between the plurality of rule pairs; clustering the overlapping rules within the rule cover using the distance matrix, wherein the overlapping rules pertain to common set of transactions in the data; selecting a representative rule from each cluster, wherein the representative rule represents transactions covered by the rules contained within each cluster; determining at least one exception for each representative rule in the rule set selected from each cluster, wherein the at least one exception is determined when the one or more antecedents provide a result other than the pre-determined consequent; and interpreting the dataset using the representative rules and the at least one exception determined for each representative rule in the rule set using an interpretation module (122).

The present application provides a system (102) for interpretation of a dataset, the system comprising a processor (110), a rule generation module (120) adapted for computing a rule set pertaining to the dataset, wherein each rule within the rule set comprises a predetermined consequent based on one or more antecedents, generating a rule cover comprising a plurality of rules, wherein the rule cover pertain to a subset of the rule set; an interpretation module (122) adapted for calculating a plurality of distances between the plurality of rule pairs in the rule cover and generating a distance matrix based on the calculated plurality of distances between the plurality of rule pairs and storing the calculated plurality of distances between the plurality of rule pairs; clustering the overlapping rules within the rule cover using the distance matrix, wherein the overlapping rules pertain to common set of transactions in the data; selecting a representative rule from each cluster, wherein the representative rule represents transactions covered by the rules contained within each cluster; determining at least one exception for each representative rule in the rule set selected from each cluster, wherein the at least one exception is determined when the one or more antecedents provide a result other than the pre-determined consequent; interpretating the dataset using the representative rules and the at least one exception determined for each representative rule in the rule set and a database (108) adapted for storing the dataset.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
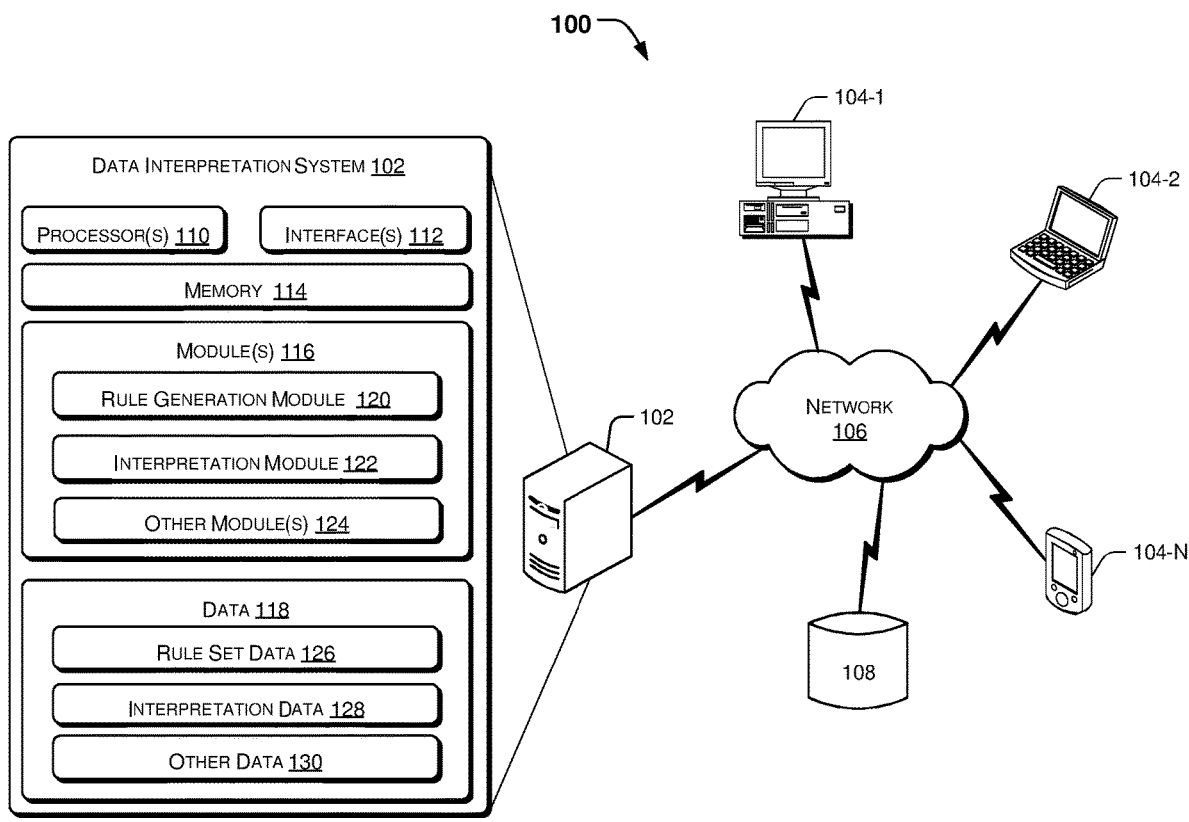
FIG. 1 illustrates a network environment implementing a data interpretation system, according to an embodiment of the present subject matter.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter relates to systems and methods for interpreting a dataset having a plurality of itemsets. A dataset may be understood as a collection of data. In an example, the dataset may pertain to market basket data or consumer data, and the like.

Generally, enterprises store significant quantities of data as information assets. However, this data is often large, e.g.,number of transactions in a supermarket can be large, and it is hard to summarize the data using computational techniques. The goal of the data mining analysis is to come-up with a small set of rules that are learnt from the data and help the business analysts in understanding important patterns. However, such techniques often return a large number of redundant results and it becomes difficult to interpret them and to summarize the given data.

Traditionally there are a number of ways for dealing with grouping of association rules and finding exceptions for them. However, they are dealt with separately and none of the existing techniques incorporate both. Further, top-K rules identified by ordering the rules using statistical measures of interestingness, provides low coverage, i.e., most of the pruned rules cover a small fraction of the input-data and therefore does not provide a clear picture about the input-data. The lack of a comprehensive view of the input data drives a variety of problems.

Conventionally, enterprises have been unable to properly leverage available data, such as pertaining to different customers, stored in multiple data source locations and can only obtain a fragmented view of a customer and the customer's relationships with various enterprises. None of the existing techniques is able to leverage all customer data to create and maintain a unified and comprehensive view of a customer across multiple disparate data sources. Often it becomes relevant to analyze all possible relationships before settling on any one. The existing techniques therefore does not analyze the relationship data that holistically expresses relationship between various entities associated with an enterprise.

Accordingly, the present subject matter provides a system and a method for interpreting a dataset comprising plurality of itemsets stored within a database, such as a transaction database or an Exploratory Data Repository (EDR). The EDR may include associated data having one or more itemsets. In an example, the EDR may include associated data pertaining to any field, such as consumer behavior, vehicle data, and sensor data. Further, the EDR may be created or may be obtained from an external source. The present subject matter may include a data interpretation system. The data interpretation system may provide different interpretations of the plurality of itemsets.

Once the EDR is obtained or created, the data interpretation system may identify a plurality of frequently occurring itemsets within the transaction database. In an example, the frequently occurring itemsets may be identified by employing any of the existing frequent pattern mining techniques. In an example, each of the plurality of frequently occurring itemsets form a rule for a pre-determined consequent based on one or more antecedents. Further, for each of the frequently occurring itemsets, the data interpretation system may evaluate value of at least one parameter that may be associated with the rule. In an example, the at least one parameter may include a support of the rule, a confidence of the rule and a lift of the rule.

In an implementation, once the value pertaining to the at least one parameter associated with the rule are evaluated, the data interpretation system may compute a set of rules pertaining to the itemsets. In an implementation, the set of rules may be computed based on an association rule mining technique. In an example, association rules may be understood as if/then statements that facilitate in understanding relationships between the itemsets in an information repository, such as the EDR. In the present implementation, the set of rules are generated for the consequent based on the value of the at least one parameter. In an example, only those rules are considered in the set of rules which have the support and the confidence above a pre-defined threshold value.

Once the set of rules is generated, the data interpretation system may identify a rule cover from the set of rules. In an implementation, the data interpretation system may arrange the rules in a descending order of support. Thereafter, those rules are selected for which the coverage of the rules is above a pre-defined threshold value. Thereafter, only a subset of rules are selected which covers almost the same amount of data as covered by the original ruleset. These rules form the rule cover for the consequent. In an implementation, many of the identified rules, in the cover, may overlap with each other, i.e., they may cover many of the same transactions in the input data. In an example, the data interpretation system may calculate degree of overlap between the chosen rules.

Based on the degree of overlap, a distance between rule pairs is calculated and a distance matrix is computed and the data interpretation system may cluster the rules in the rule cover. In an implementation, the clustering may be performed by data clustering applications, such as Density Based Spatial Clustering of Applications with Noise (DB-SCAN). In an example, the data interpretation system may employ any distance measure, such as distance between centroids of the clusters, to determine inter-cluster distance.

Once all the rules of the transaction database are clustered based on the above-mentioned steps, the data interpretation system may select one rule from each cluster to interpret the cluster. In an implementation, the data interpretation system may select one rule from each cluster by employing a batch mode or an interactive mode technique. For example, in the batch mode, the one rule is selected based on the parameters associated with the rule, such as the rule having highest support or having highest confidence, may be automatically selected by the data interpretation system from each cluster. In the interactive mode, a user may interactively select alternative rules from each cluster, thereby providing multiple explanations to the same cluster.

In an implementation, the data interpretation system may determine a set of exceptions for every rule selected from each cluster. For example, the set of exceptions may be computed for the antecedents for a result other than the consequent. The exceptions may indicate deviations from the usual patterns and therefore facilitate strategic planning.

Thus, the present subject matter facilitates in providing multiple explanations of the same dataset. Further, the present subject matter provides various exceptions that may be associated with each rule to enable analysts in understanding various deviations of the rule. In addition, the explanations provided by the present subject matter are comprehensive in nature as they are based on the rules having a coverage above a pre-defined threshold value.

While aspects of described system(s) and method(s) of interpreting a dataset can be implemented in any number of different computing devices, environments, and/or configurations, the implementations are described in the context of the following example system(s) and method(s).

FIG. 1 illustrates a network environment 100 implementing a data interpretation system 102 for interpreting a dataset, according to an example of the present subject matter. The data interpretation system 102 may be implemented as, but is not limited to, desktop computers, hand-held devices, laptops, or other portable computers, tablet computers, and the like. The network environment 100, apart from the data interpretation system 102, includes one or more computing devices 104-1, 104-2, . . . , 104-N. For the purpose of explanation and clarity, the computing devices 104-1, 104-2, 104-N, are hereinafter collectively referred to as computing devices 104 and hereinafter individually referred to computing device 104. In the network environment 100, the data interpretation system 102 is connected to the computing devices 104 through a network 106.

The network 106 may be a wireless network, wired network, or a combination thereof. The network 106 can be implemented as one of the different types of networks, such as intranet, telecom network, electrical network, local area network (LAN), wide area network (WAN), Virtual Private Network (VPN), internetwork, Global Area Network (GAN), the Internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, and storage devices, Although the data interpretation system 102 and the computing devices 104 are shown to be connected through a network 106, it would be appreciated by those skilled in the art that the data interpretation system 102 and the computing devices 104 may be distributed locally or across one or more geographic locations and can be physically or logically connected to each other.

In an implementation, the data interpretation system 102 may be coupled to a database 108. Although not shown in the figure, it will be understood that the database 108 may also be connected to the network 106 or any other network in the network environment 100. In an implementation, the database 108 may include one or more datasets that may be used by the data interpretation system 102. In an implementation, the database 108 may be provided as a relational database and may store data in various formats, such as relational tables, object oriented relational tables, indexed tables. However, it will be understood that the database 108 may be provided as other types of databases, such as operational databases, analytical databases, hierarchical databases, and distributed or network databases.

The data interpretation system 102 may be coupled to the computing devices 104 for various purposes. For example, the data interpretation system 102 may be connected to a computing device 104 to provide access to an information repository, such as the EDR, pertaining to an enterprise. The implementation and functioning of the data interpretation system 102 to interpret a dataset is as described below.

In one implementation, the data interpretation system 102 includes one or more processor(s) 110, interface(s) 112, and a memory 114, coupled to the processor(s) 110. The processor(s) 110 can be a single processing unit or a number of units, all of which could include multiple computing units. The processor(s) 110 may be implemented as one or more microprocessors, microcomputers, microcontrollers, digital signal processors, central processing units, state machines, logic circuitries, and/or any devices that manipulate signals based on operational instructions. Among other capabilities, the processor(s) 110 is configured to fetch and execute computer-readable instructions and data stored in the memory 114.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 112 may include a variety of software and hardware interfaces, for example, interfaces for peripheral device(s), such as a keyboard, a mouse, an external memory, and a printer. The interface(s) 112 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 112 may include one or more ports for connecting the data interpretation system 102 to a number of computing devices 104. In various example implementations discussed below, the data interpretation system 102 communicates with the computing devices 104 via the interfaces 112.

The memory 114 may include any computer-readable medium known in the art including, for example, volatile memory, such as static random access memory (SRAM) and dynamic random access memory (DRAM), and/or non-volatile memory, such as read only memory (ROM), erasable programmable ROM flash memories, hard disks, optical disks, and magnetic tapes. The data interpretation system 102 also includes modules 116 and data 118.

The modules 116, amongst other things, include routines, programs, objects, components, data structures, etc., which perform particular tasks or implement particular abstract data types. The modules 116, includes a rule generation module 120, an interpretation module 122, and other module(s) 124. The other module(s) 124 may include programs or coded instructions that supplement applications and functions of the data interpretation system 102.

On the other hand, the data 118, inter glia serves as a repository for storing data processed, received, and generated by one or more of the modules 116. The data 118 includes, for example, rule set data 126, interpretation data 128, and other data 130. The other data 130 includes data generated as a result of the execution of one or more modules in the other module(s) 124.

In an implementation, the rule generation module 120 may identify a plurality of frequently occurring itemsets in a dataset. In an example, each transaction may contain one or more items from the dataset. For example, each survey response may be understood as a transaction, in which items may be customer's response to each question asked. Similarly, in multi-sensor data, each time step may be understood as a transaction where the individual values of different sensors form the items of the dataset. The dataset may be represented as:

$$D=\{i_1, i_2, \ldots i_n\}$$

In an example, a subset of D may be referred to as an itemset. Further, frequently occurring itemsets may be understood as those items that co-occur more often than other itemsets in the dataset. In an example, the dataset may be stored within the database 108 associated with the data interpretation system 102. Such frequently occurring itemsets may form a rule for a pre-determined consequent based on one or more antecedents. A consequent may be understood as an outcome of the occurrence of the itemsets. Each frequent itemset, such as {X, y} may form a ruler r for a pre-determined consequent of interest (COI), such as y. In this case, the subset of items, X may be considered as an antecedent, i.e., X ---> y. In an implementation, the data interpretation system 102 may employ a FP growth mechanism to determine the frequently occurring itemsets in the dataset.

For example, considering that the dataset pertains to a retail store where the frequently occurring itemsets may be buying of bread, milk and butter by customers. Based on the shopping behavior of the customers, it may be noted that a rule such as: if a customer buys bread and milk, he/she also buys butter. Accordingly, bread and milk may be understood as the antecedents that result in the consequent, which in this case is butter.

In an implementation, the rule generation module 120 may evaluate at least one parameter associated with the rule. For example, the at least one parameter may include a support of the ruleS(r). In an example, the support of the rule may be determined by evaluating a percentage of transactions that contain all items in the frequent itemset. Further, the at least one parameter may include confidence value of a ruleC(r). The confidence of a rule is identified by evaluating the probability of occurrence of the consequent based on the antecedents. In other words, the confidence of a rule is represented as $C(r)=P(y/X)$. In addition, the at least one parameter may include lift of a rule which may be understood as a measure of interestingness of the rule. The lift of a rule may be defined as ratio of confidence of the rule and probability of occurrence of the consequent. In other words, the lift of the rule may be represented as $L(r)=P(y/X)/P(y)$.

Further, the rule generation module 120 may compute a plurality of rule sets pertaining to the dataset based on the at least one parameter. In an implementation, the rule generation module 120 may apply an association rule mining technique to compute a plurality of rule sets. In an example, the plurality of rule sets may be generated based on the support of the rules and the confidence of the rule. For example, the plurality of rule sets (R) are generated for a pre-determined COI with support greater than $\tau_s$ and confidence greater than $\tau_p$. In an implementation, the plurality of rule sets are generated based on the frequently occurring itemsets. The rule generation module 120 may store the details about the rule sets as rule set data 126. In an example, $\tau_s$ and $\tau_p$ may be understood as pre-defined threshold values that may be defined by a system administrator. Therefore, all the rule sets (R) that are generated for a common consequent (y) and have the support and confidence above the pre-defined threshold values, may be represented as:

$$R=\{r_1, r_2, \ldots, r_N\} \quad (1)$$

In an implementation, the interpretation module 122 may, based on the rule sets, compute a rule cover $R_{co}$. In an example, coverage of a rule may indicate the percentage of transaction where the rule is satisfied out of those that contains the consequent of interest y. In an example, coverage of a rule may be represented as:

$$\rho(r)=P(X \cup y)/P(y)$$

Therefore, for the rule set (R), having a common consequent (y), the rule cover is defined as:

$$R_{co}=\{r_1, r_2, \ldots, r_k\}$$

In an implementation, $R_{co}$ may be understood as a subset of R, which covers almost same set of transactions as covered by R.

In an example, in order to compute the rule cover, the interpretation module 122 may scan or list the rule sets in descending order of support. Further, the interpretation module 122 may add the listed rules to the rule cover until a pre-defined number of transactions having the COI are covered. In an alternative example, the interpretation module 122 may select top-K rules and include them in the rule cover. Once the rule cover is identified, the interpretation module 122 may determine a degree of overlap between two rules. For example, many rules may cover same set of transactions in the data, therefore the interpretation module 122 may quantify the degree of overlap $O_{ij}$ between two rules as:

$$O_{ij} = \frac{S(r_i \cap r_j)}{\min(S(r_i)S(r_j))}$$

Further, the interpretation module 122 may, based on the degree of overlap, cluster the rules using a distance measure $d_{ij}$. In an implementation, the interpretation module 122 may employ a Density-based spatial clustering of applications with noise (DBSCAN) technique to cluster the rules based on the degree of overlap. In an example, the distance measure between a pair of rules may be defines as:

$$d_{ij} = \frac{1}{(O_{ij}+k)}$$

where k is a small constant and is equal to 0.01.

Once the clusters have been identified, the interpretation module 122 may select one representative rule from each cluster to summarize the cluster. In an example, the one rule may be understood to provide an interpretation of the entire itemsets within the cluster. The representative rule provides an interpretation of the entire set of transactions covered by the rules present in that cluster. In an implementation, the interpretation module 122 may employ a batch mode to select a rule for each cluster. In an example, the batch mode includes automatically selecting a rule to summarize the cluster based on a pre-defined parameter. In one example, the rule having the highest support in the cluster may be automatically selected to interpret the cluster. In another example, the rule having the highest confidence in the cluster may be automatically selected in the batch mode In another implementation, the interpretation module 122 may facilitate a user to interactively select the rule to summarize the cluster. In an example, the user may interactively choose alternative rules from each cluster to obtain multiple interpretations of the same set of transactions. The interpretation module 122 may store the explanations about the clusters as interpretation data 128.

Further, the interpretation module 122 may determine at least one exception for each representative rule selected from the clusters in the rule set. In an example, to determine the exception, the interpretation module 122 may identify the outcome of the same antecedents when the consequent is different. For example, if a pre-defined consequent was y, the interpretation module 122 may determine various transactions when the consequent was −y. Such an exercise may provide a set of exceptions for every rule in the rule set. In an implementation, the exceptions for every rule are determined based on a confidence threshold $\tau_e$. For example, for a rule, r:X ----> y, the confidence threshold may be defined as:

$$\tau_e = (100 + \Delta c - C(r))$$

where $\Delta c$, is a confidence gap for the rule r.

In an example, if the confidence of the rule is 85%, that indicates that remaining 15% of the time, the rule is not satisfied. In other words, the consequent is not achieved and the exceptions are met for 15%. In an implementation, the above-described steps were applied to various datasets, such as Mushroom dataset, Car-survey dataset, and sensor dataset. The technique as described in the present subject matter provided succinct results in terms of rules and exceptions. In addition, the present subject matter provided multiple interpretations of the same set of transactions from the input data, thereby providing a holistic view about the dataset, Accordingly, the present subject matter facilitates in providing a coverage based explanation for a dataset. The present subject matter takes into consideration any overlap taking place between rules and accordingly provides multiple interpretations of the same set of transactions. Further, the present subject matter determines exceptions in the rules, i.e., deviations from usual patterns. Such an analysis of the dataset facilitates in decision-making and determining strategies that may be relevant to the enterprise.

Figure 2:
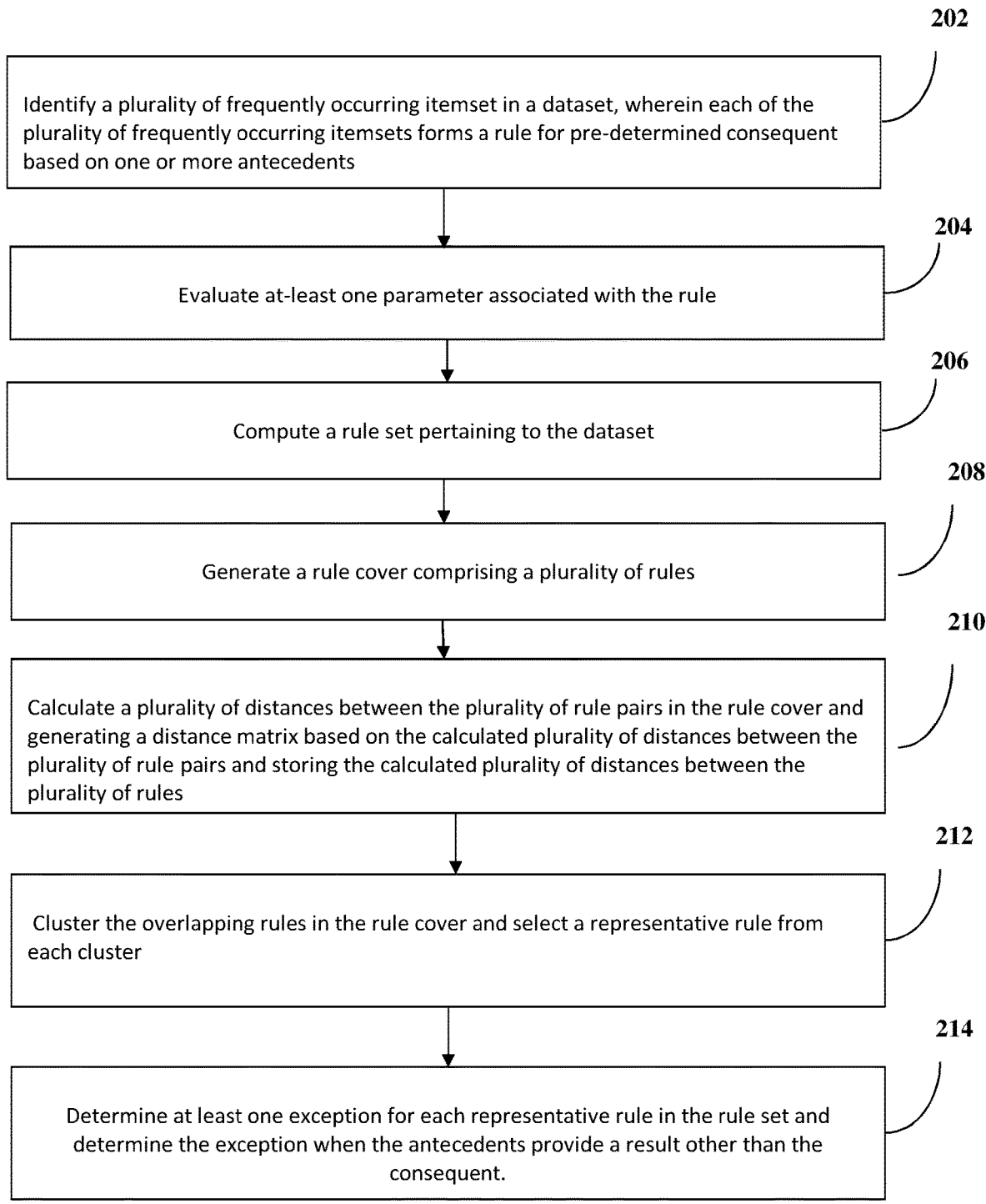
FIG. 2 illustrates a method for interpreting a dataset having a plurality of itemsets, according to another embodiment of the present subject matter.

FIG. 2 illustrates a method 200 for interpreting a dataset comprising a plurality of itemsets, in accordance with an embodiment of the present subject matter. The methods 200 may be described in the general context of computer executable instructions. Generally, computer executable instructions can include routines, programs, objects, components, data structures, procedures, modules, functions that perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

Referring to FIG. 2, at block 202, the method 200 may include identifying a plurality of frequently occurring itemsets in the dataset. Each of the plurality of frequently occurring itemsets form a rule for a pre-determined consequent based on one or more antecedents. In an implementation, the rule generation module 120 may identify the plurality of frequently occurring itemsets in the dataset. In an example, the rule generation module 120 may employ an FP growth technique or any frequent itemset mining technique to identify the plurality of frequently occurring itemsets.

At block 204, the method 200 may include evaluating at least one parameter associated with the rule. In an implementation, the rule generation module 120 may evaluate the at least one parameter. For example, the parameter may include a confidence of the rule, a support of the rule, and a lift of the rule.

Further, at block 206, the method 200 may include computing a plurality of rule sets pertaining to the dataset. In an implementation, the rule generation module 120 may compute the plurality of rule sets based on the at least one parameter. In an example, the rule generation module 120 may employ an association rule mining technique to compute a plurality of rule sets.

In addition, at block 208, the method 200 may include generating a rule cover. The rule cover may comprise of plurality of rules.

In addition, at block 210, the method 200 may include calculating a plurality of distances between the plurality of rule pairs and generating a distance matrix based on the calculated plurality of distances between the plurality of rule pairs and storing the calculated plurality of distances between the plurality of rule pairs.

In addition, at block 212, the method 200 may include clustering overlapping rules within the dataset. The overlapping rules may be understood as those rules that pertain to common transactions from the dataset. In an implementation, the interpretation module 122 may cluster the overlapping rules. To do so, the interpretation module 122 may identify the overlapping rules by using a distance measure. Once the overlapping rules are identified, the interpretation module 122 may cluster the overlapping rules based on a degree of overlap and selecting a rule from each cluster. The at least one rule interprets the transactions covered by the rules contained within each cluster. In an implementation, the interpretation module 122 may select a rule from each cluster to interpret or provide an explanation of the transactions covered by the rules within the cluster. In an example, the interpretation module 122 may select the at least one rule by using a batch mode. In the batch mode, the rule is automatically selected based on a pre-defined parameter. In another example, the interpretation module 122 may facilitate the user to select the rule to obtain the explanation for the cluster. The user may select another rule for the same cluster to get multiple explanations for the same cluster.

Furthermore, at block 214, the method 200 may include determining at least one exception for each representative rule selected from the clusters in the rule set. The exception may provide a result other than the consequent of the rule. In an implementation, the interpretation module 122 may determine exception for each rule in the rule set. In an example, the exception may be understood as a deviation from the usual patterns.

Although embodiments for methods and systems for the present subject matter have been described in a language specific to structural features and/or methods, it is to be understood that the present subject matter is not necessarily limited to the specific features or methods described. Rather, the specific features and methods are disclosed as exemplary embodiments for the present subject matter.

We claim:

1. A method for interpreting a dataset comprising a plurality of items, the method comprising a processor implemented steps of:
   computing, by a rule generation module, a rule set pertaining to the dataset, by:
      identifying a plurality of co-occurring itemsets in the dataset, wherein each of the plurality of co-occurring itemset forms a rule within the rule set; wherein each rule within the rule set comprises a pre-determined consequent based on one or more antecedents; and
      evaluating a value of at least one parameter associated with the rule within the rule set; wherein the rule set is computed for the pre-determined consequent based on the value of at least one parameter;

generating, by the rule generation module, a rule cover comprising a plurality of rules, wherein the rule cover pertains to a subset of the rule set, and wherein the rule cover is generated by listing the rules of the rule set in descending order of a support of the rule and by adding the listed rules to the rule cover until a pre-defined number of transactions having a consequent of interest are covered;

calculating, by an interpretation module, a plurality of distances between the plurality of rule pairs, based on a degree of overlap of the plurality of rules in the rule cover, and generating a distance matrix based on the calculated plurality of distances between the plurality of rule pairs in the rule cover and storing the calculated plurality of distances between the plurality of rule pairs;

clustering, by the interpretation module, overlapping rules within the rule cover using the distance matrix, wherein the overlapping rules pertain to the rules having common set of transactions in the data;

selecting, by the interpretation module, a representative rule from each cluster, wherein the representative rule represents transactions covered by the rules contained within each cluster;

determining, by the interpretation module, at least one exception for each representative rule in the rule set selected from each cluster, wherein the at least one exception is determined when the one or more antecedents provide a result other than the pre-determined consequent; and interpreting, by the interpretation module, the dataset using the representative rule and the at least one exception determined for each representative rule in the rule set.

2. The method of claim 1, wherein the plurality of items pertain to a plurality of unique fields in a transactional database.

3. The method of claim 1, wherein the rule set computation is based on an association rule mining technique.

4. The method of claim 1, wherein the at least one parameter comprises the support of the rule, a confidence of the rule, and a lift of the rule.

5. The method of claim 1, wherein the representative rule is selected by a batch mode technique or an interactive mode technique.

6. The method of claim 1, the at least one exception is determined based on a pre-defined confidence threshold.

7. The method of claim 1, further comprises of storing the dataset in a database.

8. A data interpretation system for interpreting a dataset having a plurality of items, the data interpretation system comprising:
   a processor;
   a rule generation module, adapted for
      computing a rule set pertaining to the dataset, by:
         identifying a plurality of co-occurring itemsets in the dataset, wherein each of the plurality of co-occurring itemset forms a rule within the rule set; wherein each rule within the rule set comprises a pre-determined consequent based on one or more antecedents; and
         evaluating a value of at least one parameter associated with the rule within the rule set; wherein the rule set is computed for the pre-determined consequent based on the value of at least one parameter; and
      generating a rule cover comprising a plurality of rules, wherein the rule cover pertain to a subset of the rule set, and wherein the rule cover is generated by listing the rules of the rule set in descending order of a support of the rule and by adding the listed rules to the rule cover until a pre-defined number of transactions having a consequent of interest are covered;
   an interpretation module, adapted for
      calculating a plurality of distances between the plurality of rule pairs, based on a degree of overlap of the plurality of rules in the rule cover, and generating a distance matrix based on the calculated plurality of distances between the plurality of rule pairs and storing the calculated plurality of distances between the plurality of rule pairs;
      clustering overlapping rules within the rule cover using the distance matrix, wherein the overlapping rules pertain to the rules having common set of transactions in the data;
      selecting a representative rule from each cluster, wherein the representative rule represents transactions covered by the rules contained within each cluster;
      determining at least one exception for each representative rule in the rule set selected from each cluster, wherein the at least one exception is determined when the one or more antecedents provide a result other than the pre-determined consequent; and
      interpreting the dataset using the representative rules and the at least one exception determined for each representative rule in the rule set; and
   a database adapted for storing the dataset.

9. A non-transitory computer-readable medium having embodied thereon a computer program for executing a method interpreting a dataset comprising a plurality of items, the method comprising:
   computing a rule set pertaining to the dataset, by:
      identifying a plurality of co-occurring itemsets in the dataset, wherein each of the plurality of co-occurring itemset forms a rule within the rule set; wherein each rule within the rule set comprises a pre-determined consequent based on one or more antecedents; and
      evaluating a value of at least one parameter associated with the rule within the rule set; wherein the rule set is computed for the pre-determined consequent based on the value of at least one parameter;
   generating a rule cover comprising a plurality of rules, wherein the rule cover pertain to a subset of the rule set, and wherein the rule cover is generated by listing the rules of the rule set in descending order of a support of the rule and by adding the listed rules to the rule cover until a pre-defined number of transactions having a consequent of interest are covered;
   calculating a plurality of distances between the plurality of rule pairs, based on a degree of overlap of the plurality of rules in the rule cover, and generating a distance matrix based on the calculated plurality of distances between the plurality of rule pairs in the rule cover and storing the calculated plurality of distances between the plurality of rule pairs;
   clustering overlapping rules within the rule cover using the distance matrix, wherein the overlapping rules pertain to the rules having common set of transactions in the data;

selecting a representative rule from each cluster, wherein the representative rule represents transactions covered by the rules contained within each cluster;

determining at least one exception for each representative rule in the rule set selected from each cluster, wherein the at least one exception is determined when the one or more antecedents provide a result other than the pre-determined consequent; and interpreting the dataset using the representative rules and the at least one exception determined for each representative rule in the rule set.

* * * * *